April 26, 1955

R. C. RUSSELL 2,706,973

AUTOMATICALLY ADJUSTABLE VALVE MECHANISM

Filed Nov. 29, 1952

INVENTOR.
ROBERT C. RUSSELL
BY Hudson, Boughton,
Williams, David & Hoffmann
ATTORNEYS

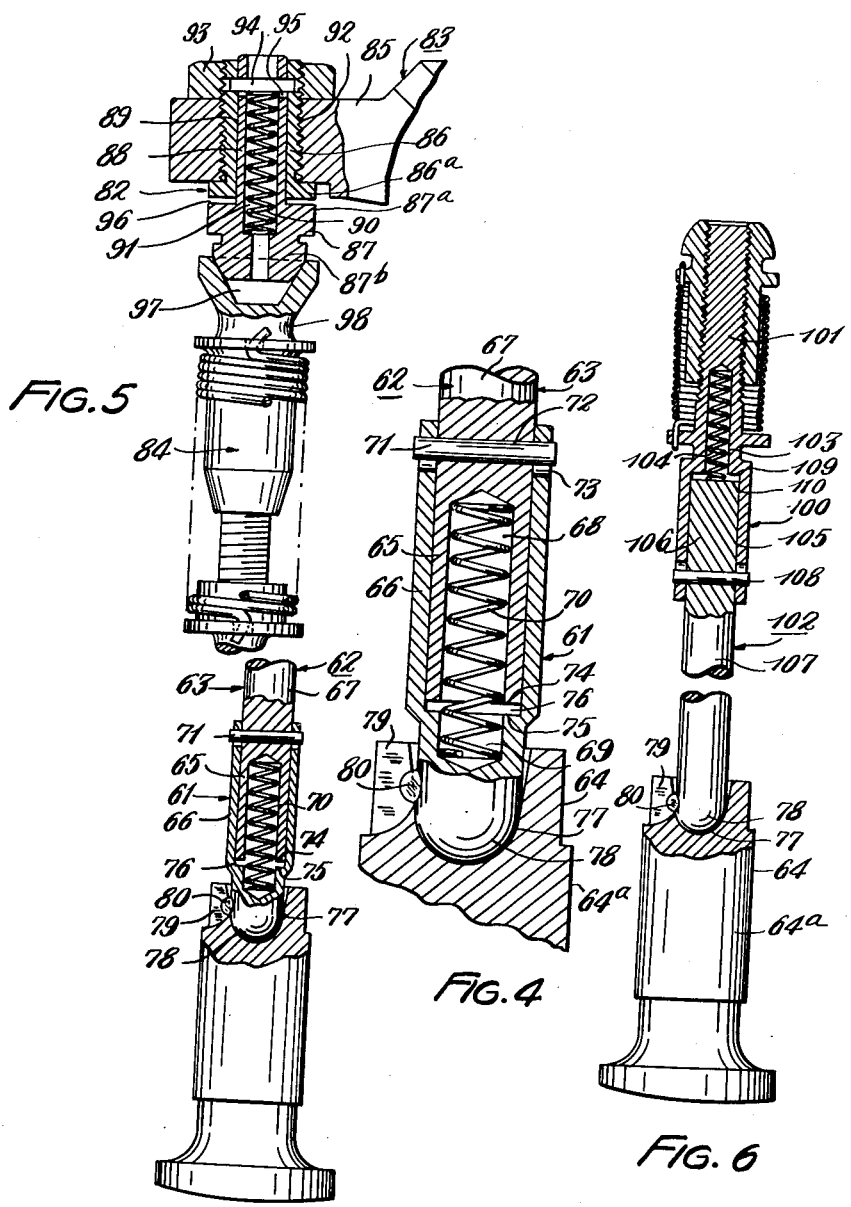

United States Patent Office 2,706,973
Patented Apr. 26, 1955

2,706,973
AUTOMATICALLY ADJUSTABLE VALVE MECHANISM

Robert C. Russell, South Euclid, Ohio, assignor to Eaton Manufacturing Company, Cleveland, Ohio, a corporation of Ohio Application November 29, 1952, Serial No. 323,194

9 Claims. (Cl. 123—90)

This invention relates to valve actuating mechanisms of the automatic length adjusting type and, more particularly, to a novel compensating means adapted to compensate for irregularities occurring in a valve actuating mechanism of such automatic length adjusting type.

In the operation of internal combustion engines having valve actuating mechanisms of the automatic length adjusting type, it has been found that burning of the exhaust valves sometimes occurs as the result of improper seating of such valves. This condition is caused by the effects of irregularities occurring in one or more components of the actuating mechanism, as for example, irregularities in the base circle portion of the actuating cams for such exhaust valves. These irregularities, even though only a few thousandths of an inch in amount, can cause the exhaust valves to remain unseated during the power stroke, or during a portion of the power stroke, and hence, be subjected to and burned by the hot combustion gases escaping from the engine cylinder. An improper functioning of the intake valves may also result from such irregularities being present in the actuating cams or other components of the actuating mechanism for such intake valves.

The present invention seeks to overcome this difficulty and, as one of its objects, accordingly provides valve actuating mechanism of the automatic length adjusting type and which includes novel compensating means adapted to compensate for irregularities occurring in, or in connection with the functioning of, one or more components of such mechanism.

Another object of is to provide improved valve actuating mechanism of the character mentioned, in which the novel compensating means comprises relatively movable thrust transmitting members having a pair of spaced cooperating shoulders and a spring which is effective to resist the automatic lengthening means, so as to normally maintain the shoulders in a spaced relation, but which spring is adapted to be flexed to insure seating of the valve.

A further object is to provide improved valve actuating mechanism of the kind above referred to, in which the automatic length adjustment is accomplished by a pair of threadedly connected screw and nut members and an adjusting spring, preferably a torsion spring, normally biasing the screw and nut members in a direction to cause lengthening of the mechanism, and in which the spring of the compensating means is preferably a preloaded spring and is effective to maintain the spaced relation of the cooperating shoulders of the compensating means in opposition to the action of the length adjusting spring.

Still another object is to provide an improved valve actuating mechanism in the form of a linkage having such automatic lengthening means and such compensating means embodied therein, and in which one end of the linkage is non-rotatably connected with a tappet, or the like, to which axial and rotary movements are imparted by an actuating cam.

Other objects and advantages of the invention will be apparent in the following detailed description and in the accompanying sheets of drawings, forming a part hereof and in which:

Figs. 3 and 4 are fragmentary views, partially in vertical section, and showing a modified form of the compensating means, Fig. 4 being a larger scale showing thereof; and Figs. 5 and 6 are elevational views, partially in vertical section, showing other modified forms of the compensating means.

Figure 1:
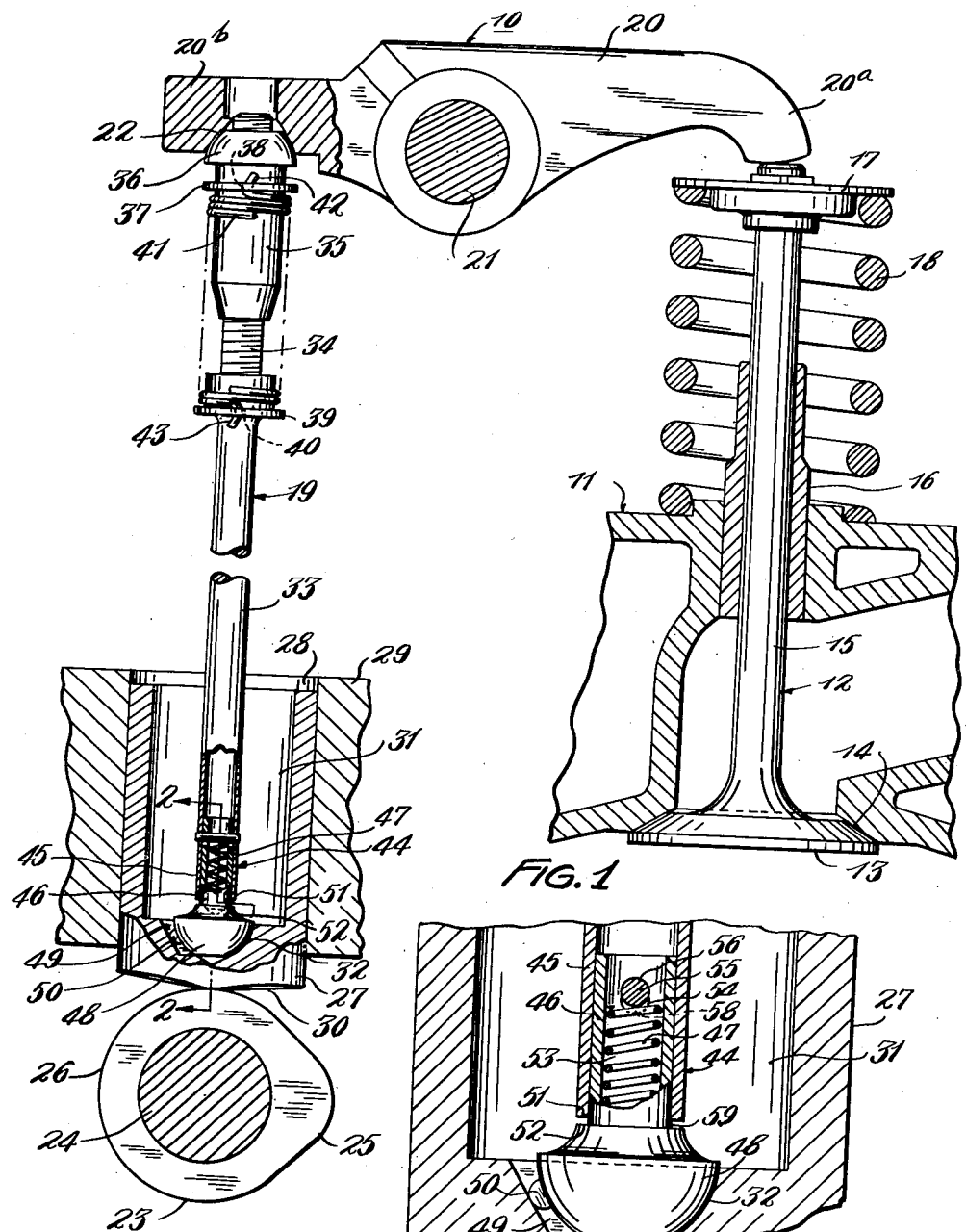
Fig. 1 is an elevational view, mainly in vertical section and showing a valve actuating mechanism embodying the novel compensating means of the present invention.

As one practical embodiment of this invention, the drawings show the valve actuating mechanism 10 as forming a part of an internal combustion engine 11 having a movable valve 12. The valve 12 is of a conventional type having a head 13 engageable with a valve seat 14 and a stem 15 extending through and slidable in a bushing 16. A spring seat 17 mounted on the outer or upper end of the valve stem 15, is engaged by a valve spring 18 which acts to normally urge the head 13 of the valve toward a closed position in engagement with the valve seat 14.

The valve actuating mechanism 10 also includes a push rod assembly 19, and a rocker member 20 mounted on a rockshaft 21 and operable to transmit actuating movement between the push rod assembly and the valve stem 15. The rocker member 20 is provided at one end thereof with an arm 20ª engaging the upper end of the valve stem 15, and is provided at its other end with an arm 20ᵇ having a generally conical bearing socket 22 therein.

The actuating movement for the valve 12 is supplied by a conventional actuating cam 23 carried by a rotatable camshaft 24 and having a lobe portion 25 and a base circle portion 26. A tappet 27, slidable in a guide passage 28 of a tappet guide 29, has the lower end or tappet face 30 thereof in engagement with the cam 23. Fig. 1 of the drawings shows the actuating mechanism 10 in a condition of rest in which the valve 12 is in its closed position and the tappet face 30 is in engagement with the base circle portion 26 of the cam 23.

The tappet 27 is here shown as being of the hollow or barrel type having an axial recess 31 therein into which the lower end of the push rod assembly 19 extends. The tappet face 30 is of a contoured shape, such that a desired rotary or oscillating movement will be imparted to the tappet by the cam 23 during the usual axial or reciprocating movement which is imparted to the tappet by the cam and the expansive force of the valve spring 18. The tappet 27 is also provided at the lower end thereof with a generally conical bearing socket 32 to which further reference will be presently made. The contoured shape of the tappet face 30 is more fully disclosed and is claimed in copending patent application Serial No. 278,339.

The push rod assembly 19 comprises a main push rod 33 and a pair of relatively rotatable threadedly engaged screw and nut members 34 and 35, of which the screw member is here shown as being connected with or formed as a portion of the main push rod. The nut member 35 is provided at its upper end with a substantially spherical bearing head 36 which is seated in the conical bearing socket 22 of the rocker member 20. Adjacent the bearing head 36, the nut member 35 is provided with a substantially radial annular flange or collar 37 having an opening 38 therein. At a point adjacent the lower end of the screw member 34, the push rod 33 is provided with a similar annular radial flange 39 having an opening 40 therein.

The cooperating screw and nut members 34 and 35, together with a torsional adjusting spring 41, comprise an automatic length adjusting means for the push rod assembly 19. The torsion spring 41 is disposed in surrounding relation to the cooperating screw and nut members and is provided at its ends with hook elements 42 and 43, which are engaged, respectively, in the openings 38 and 40 of the flanges 37 and 39. The torsion spring 41 is preferably a preloaded spring and acts continuously on the screw and nut members 34 and 35 tending to cause relative rotation therebetween in a direction to produce an axial lengthening of the push rod assembly 19. This automatic length adjusting means is more fully disclosed and is claimed in copending application Serial No. 212,543, filed February 24, 1951, now Patent No. 2,642,049 issued June 16, 1953.

For the purposes of the present invention, it is sufficient to explain that when a valve opening movement is being transmitted through the actuating mechanism 10 from the cam 23 to the valve 12, a clockwise rotary movement supplied to the push rod 33 by the cam through the tappet 27, will cause the screw member 34 to be advanced into the nut member 35 resulting in a shortening of the push rod assembly and a torsional stressing, or further torsional stressing, of the spring 41. This automatic shortening of the push rod assembly 19 introduces what can be conveniently referred to as "lift loss" into the actuating mechanism 10 and which is desirable for producing a more positive valve closing function during the succeeding portion of the cycle of operation.

When the lobe portion 25 of the cam 23 leaves the tappet 27, permitting the valve spring 18 to seat the valve head 13 against the valve seat 14, the mechanism 10 assumes a relatively unloaded condition, whereupon the torsion spring 41 causes relative rotation between the screw and nut members 34 and 35 in a direction to lengthen the push rod assembly 19 and take up any lost motion or lift loss existing in the mechanism. For the purpose of these shortening and lengthening actions, the friction existing between the bearing head 36 and the bearing socket 22 is such that the nut member 35 will be held relatively stationary while a relative rotary movement is imparted to the push rod 33 by the tappet 27 for the shortening action, but will be free for rotation relative to the push rod by the torsion spring 41 for the lengthening action.

As has already been indicated above, the existence of irregularities in one or more components of the mechanism 10 such as in the base circle portion 26 of the cam 23, may interfere with proper seating of the valve 12. The present invention overcomes this difficulty and assures proper seating of the valve by providing, in the mechanism 10, a compensating means 44 which will now be described.

The compensating means 44 comprises a pair of relatively movable portions or members 45 and 46 embodied in the push rod assembly 19 and an adjusting spring 47. The member 45 is here shown as comprising the hollow lower end of the main push rod 33, and the member 46 is here shown as being a short hollow stem which is slidably engaged in the member 45. The member 46 is provided at the lower end thereof with a generally spherical bearing head 48, which is seated in the conical bearing socket 32 of the tappet 27 for forming an operative connection between the tappet and the lower end of the push rod assembly 19. It is desirable that this operative connection be a non-rotatable connection, that is to say, one in which relative rotation between the tappet and push rod assembly is prevented. This non-rotatable relation is obtained by providing the bearing socket 32 of the tappet with a groove or keyway 49 in which an integral lug projection or key 50 of the bearing head 48 engages. The non-rotatable connection between the tappet and push rod assembly is more fully disclosed and is claimed in copending patent application Serial No. 299,790.

Figure 2:
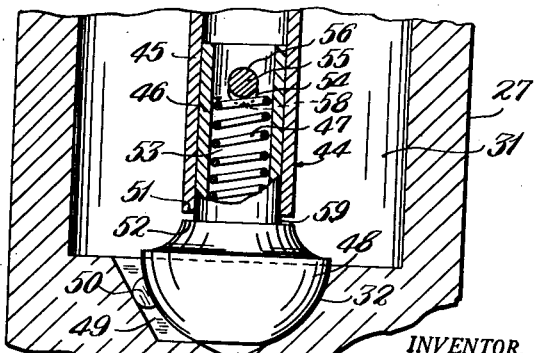
Fig. 2 is a fragmentary sectional view taken approximately as indicated by section line 2—2 of Fig. 1, and showing the compensating means on a larger scale.

The compensating means 44 also comprises a pair of substantially axially opposed shoulders 51 and 52 carried by the members 45 and 46, respectively, and which are normally maintained in a predetermined spaced relation, as shown in Figs. 1 and 2, by the compression spring 47. The shoulder 51 is an annular shoulder which is here formed by the lower end of the hollow portion or member 45, and the shoulder 52 is an annular shoulder formed on the member 46 substantially at the junction of the stem portion of this member with the bearing head 48. The axial passage or counterbore 53 of the member 46 forms a spring chamber in which the spring 47 is disposed.

As shown in the drawings, the compensating means 44 also includes a stop means which also constitutes a retaining means for maintaining the members 45 and 46 in a connected relation. This stop means is here shown as comprising axial slots 54 formed in the wall of the member 46 at substantially diametrically opposed points and a transverse stop pin 55 carried by the member 45 and extending through the slots 54. The pin 55 is connected with the member 45 by having its ends engaged with a press fit in diametrically opposed openings of this member. The upper ends of the slots 54 form stop shoulders 56 which engage the pin 55 for preventing axial separation of the members 45 and 46 and are normally held in such engagement with the pin by the expansive force of the spring 47.

The slots 54 are of a length to provide the stop means with clearance spaces 58 which are of a somewhat greater width than the clearance space 59 normally maintained between the shoulders 51 and 52. For example, the clearance space 59 should be from six to ten thousandths of an inch wide and the clearance spaces 58 should be twelve thousandths of an inch or more. The clearance spaces 58 permit relative axial movement between the members 45 and 46 when the spring 47 is being compressed, but since these slots are of a greater width than the clearance space 59, any axial thrust being transmitted through the mechanism 10 will be taken by the shoulders 51 and 52 to thereby prevent any harmful shearing force from being applied to the pin 55.

The spring 47 is preferably a preloaded spring which normally tends to produce a relative axial movement between the members 45 and 46 in a direction to produce lengthening of the push rod assembly 19 to the extent permitted by the cooperation of the slots 54 with the pin 55. The spring 47 can, therefore, also be referred to as a length adjusting spring and its load characteristics are such, in relation to the length adjusting spring 41, that it will normally resist the lengthening tendency or effect of the latter spring. For example, when the spring 47 is one which is rated to carry a spring load of six to ten pounds, it would be preloaded to approximately 75 or 80 percent of its maximum spring load.

Although the spring 47 is a relatively stronger spring than the spring 41, as has been just explained above, it is relatively weaker than the valve spring 18. During each lifting of the tappet 27 by the cam lobe 25 to transmit valve opening movement through the mechanism 10 to the valve stem 15, such movement is resisted by the relatively stronger valve spring 18 and, hence, the initial portion of this movement will compress the spring 47 to the extent permitted by the clearance space 59. When the clearance space 59 has been thus taken up, the valve opening movement is then transmitted through the shoulders 51 and 52.

To further explain the functioning of the compensating means 44, let it be assumed that an irregularity exists in the base circle portion 26 of the cam 23 in the form of a low spot which arrives under the tappet 27 at approximately the same time or immediately after the valve 12 is engaged with the seat 14 by the closing action of the valve spring 18. The occurrence of the low spot under the tappet 27 after the valve 12 has been closed and the mechanism 10 is in a relatively unloaded state, will permit the adjusting spring 41 to lengthen the push rod assembly 19, thereby moving the tappet downwardly against such low spot of the cam. Upon further rotation of the cam, the low spot moves away from the tappet, and the succeeding relatively higher normal portion of the cam then coming under the tappet, will tend to cause an opening movement to be transmitted through the mechanism 10 to the valve 12.

The characteristics of the spring 47 are such in relation to the spring 41, that this tendency to produce an undesired opening of the valve 12 or to maintain such valve in a partially open position, will cause flexing of the spring 47 to thereby prevent the actuating force from being actually applied to the valve 12. As has been indicated above, such flexing of the spring 47 is permitted by the clearance space 59. The compensating means 44 in this way effectively compensates for existing irregularities by preventing the valve from being opened, or partially opened unintentionally, or from being maintained in a partially opened condition when a full closing of the valve member is desired. During the movement of the lobe 25 away from the tappet 27, the spring 47 expands to restore the clearance space 59 and since the load characteristics of the spring 47 are such as to predominate over the lengthening tendency produced by the spring 41, the spring 47 will not again be compressed until the next arrival of the lobe under the tappet.

Figs. 3 and 4 of the drawings show compensating means 61 forming a part of a valve actuating mechanism 62 and which is generally similar to the compensating means 44 in that it is located immediately adjacent the point of connection of the push rod assembly 63 with the tappet 64 and functions in substantially the same manner and for the same purpose as the compensating means 44.

The compensating means 61 comprises a pair of relatively axially slidable members 65 and 66 of which the member 65 is formed by the lower end of the push rod 67 and has a counterbore therein forming a spring chamber 68. The member 66 comprises an axially extending sleeve in which the member 65 is slidable and is provided with a relatively short counterbore 69 forming a portion of the spring chamber 68. The compensating means 61 also comprises a preloaded compression spring 70 disposed in the spring chamber 68 and a stop means in the form of a transverse connecting pin 71 whose intermediate portion has a press fit in a transverse opening 72 of the member 65 and whose ends engage in substantially diametrically opposed slots 73 of the sleeve portion of the member 66.

The compensating means 61 also embodies a pair of thrust transmitting shoulders 74 and 75 having a clearance space 76 of a predetermined width therebetween. The shoulder 74 is formed by the lower end of the member 65 and the shoulder 75 is an internal annular shoulder formed on the member 66 adjacent the counterbore 69. In this modified form of compensating means 61, the cooperating shoulders 74 and 75 and the clearance space 76 therebetween, are protected against contaminating material which might otherwise clog the clearance space, by reason of the fact that these elements are all in a housed location internally of the hollow member 66.

The tappet 64, which is here shown as having a solid stem 64a, is provided at its upper end with a substantially semispherical bearing socket 77, and the lower end of the member 66 of the compensating means 61 is provided with a substantially semispherical bearing head 78 engaging in such bearing socket. The operating connection between the push rod assembly 62 and the tappet 64 is a non-rotatable connection by reason of the fact that the portion of the tappet containing the bearing socket 77 is provided with a radial slot or keyway 79 in which a lug projection or key 80 of the bearing head 78 engages.

Fig. 5 of the drawings shows another modified form of compensating means 82 which forms a part of a valve actuating mechanism 83 and is located in the push rod assembly 84 at the point of connection of the latter with the rocker arm 85. The compensating means 82 comprises an externally threaded bushing 86 and a push rod member 87 having an axial sleeve portion 88 slidable in the passage 89 of the bushing. The compensating means 82 also comprises a preloaded compression spring 90 located in a spring chamber 91 formed by a counterbore in the member 87.

The bushing 86 is mounted in a threaded opening 92 of the rocker arm 85 and is retained therein by means of a clamping nut 93 in engagement with the rocker arm on one side thereof and a collar 86a in engagement with the other side of the rocker arm. The member 87 is connected with the bushing 86 by means of a transverse pin 94 which extends through diametrically opposed slots 95 of the sleeve portion 88 and has its ends connected with the bushing by means of a press fit in suitable openings of the latter. The intermediate portion of the pin 94 also forms a seat for the upper end of the spring 90.

The collar 86a of the bushing 86 and the collar 87a of the push rod member 87 form a pair of cooperating axially opposed shoulders having a predetermined clearance space 96 therebetween. The lower portion of the head of the push rod member 87 is in the form of a substantially spherical bearing head 87b which is engaged in a generally conically shaped bearing socket 97 provided in the upper end of the nut member 98 of the push rod assembly 84.

Fig. 6 of the drawings shows still another modified form of compensating means 100 in which the screw member 101 of the push rod assembly 102 has a counterbore therein forming a spring chamber 103 in which the compression spring 104 is located. The screw member 101 is also provided with a depending socket portion 105 in which a member 106, formed by the upper end of the push rod 107, is axially slidable and is retained by the transverse pin 108.

The compensating means 100 also comprises a pair of cooperating substantially axially opposed shoulders 109 and 110 of which the shoulder 109 is formed by the end wall of the socket recess of the socket portion 105, and the shoulder 110 is formed by the end face of the member 106. This end face also forms a seat for the lower end of the spring 104. The lower end of the push rod 107 is connected with a tappet 64 by a non-rotatable connection of the same form as that shown in Figs. 3 and 4 and to which the same references have been applied.

From the foregoing detailed description and the accompanying drawings, it will now be readily understood that this invention provides improved valve actuating mechanism for an engine valve in which novel compensating means compensates for irregularities occurring in the construction and operation of the mechanism and effectively insures proper seating of the valve. It will now also be seen, that this novel compensating means preferably forms a part of a valve actuating mechanism of the kind embodying automatic length adjusting means and that the adjusting spring of the compensating means has a load characteristic, such that it resists and predominates over the adjusting spring of the length adjusting means. It will, likewise, be understood that, as disclosed in the drawings and foregoing description, the compensating means can be located at various different points in the valve actuating mechanism, but in all cases functions in the same efficient manner to insure proper closing of the valve by compensating for irregularities existing in the mechanism or in the valve actuating cam.

Although the valve actuating mechanism and the novel compensating means thereof have been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In valve actuating mechanism, a rotary cam, a cam follower adapted to have rotary and axial movements imparted thereto by said cam, thrust transmitting means including a pair of threadedly connected screw and nut portions, a torsion spring tending to cause relative rotation between said screw and nut portions in a direction to produce lengthening of said thrust transmitting means, connecting means connecting said cam follower with said thrust transmitting means for imparting said rotary and axial movements to the latter, other portions of said thrust transmitting means being adapted for relative axial movement therebetween and having spaced substantially opposed shoulders thereon, said other portions comprising a sleeve portion and a stem portion slidable therein and said shoulders being located internally of said sleeve portion, and a compression spring effective on said other portions for normally maintaining said shoulders in spaced relation against the lengthening action of said torsion spring.

2. Valve actuating mechanism as defined in claim 1 in which the relatively axially movable portions of said thrust transmitting means and said opposed shoulders and compression spring are located immediately adjacent to said connecting means.

3. Valve actuating mechanism as defined in claim 1 in which one of said relatively axially movable portions of said thrust transmitting means and one of said opposed shoulders are carried by the screw portion of said threadedly connected screw and nut portions.

4. In valve actuating mechanism, a rotary cam, a tappet adapted to have rotary and axial movements imparted thereto by said cam, thrust transmitting means including a pair of relatively rotatable threadedly connected screw and nut members and a pair of telescoping relatively axially movable push rod members, a pair of shoulders carried by said push rod members and having a clearance space therebetween, stop means comprising a pair of spaced stop elements carried by said push rod members and a second clearance space of a greater width than the first-mentioned clearance space, a spring biasing said screw and nut members apart and tending to produce lengthening of said thrust transmitting means, and a second spring effective on said push rod members for normally holding said shoulders spaced apart, said second spring being preloaded and adapted to maintain the spacing of said shoulders against the lengthening tendency produced by the first-mentioned spring.

5. Valve actuating mechanism as defined in claim 4 in which said stop elements comprise cooperating pin and slot elements carried by said push rod members.

6. In valve actuating mechanism, a rocker member, a tappet adapted to have rotary and axial movements imparted thereto, and a push rod assembly effective between and having its ends in engagement with said tappet and rocker member and including a compensating means, said compensating means comprising a pair of relatively axially slidable telescoping sleeve and stem portions having spaced cooperating shoulders and a spring tending to maintain said shoulders spaced apart, said shoulders being located internally of said sleeve portion.

7. In valve actuating mechanism, a rocker member, a tappet adapted to have rotary and axial movements imparted thereto, and a push rod assembly effective between and having its ends in engagement with said tappet and rocker member and including a length adjusting means and a compensating means, said length adjusting means comprising threadedly connected relatively rotatable portions, and a torsion spring adapted to cause relative rotation between said threadedly connected portions, said compensating means comprising a pair of relatively axially slidable telescoping sleeve and stem portions having spaced cooperating shoulders and a compression spring tending to maintain said shoulders spaced apart, said shoulders being located internally of said sleeve portion.

8. Valve actuating mechanism as defined in claim 7 in which said tappet has a socketed upper end and in which said compensating means is embodied in the end of the push rod assembly which is in engagement with the socketed end of said tappet.

9. In valve actuating mechanism, a rocker member, a tappet adapted to have rotary and axial movements imparted thereto, and a push rod assembly effective between and having its ends in engagement with said tappet and rocker member and including a length adjusting means and a compensating means, said length adjusting means comprising threadedly connected relatively rotatable portions and a torsion spring adapted to cause relative rotation between said threadedly connected portions, said compensating means comprising a pair of relatively axially slidable telescoping sleeve and stem portions having spaced cooperating shoulders and a compression spring tending to maintain said shoulders spaced apart, said tappet having a socketed upper end into which one end of said push rod assembly extends and said shoulders being located on said push rod assembly so as to be housed in the socket of said tappet.

References Cited in the file of this patent

UNITED STATES PATENTS

| 1,443,940 | Anderson | Feb. 6, 1923 |
| 1,607,128 | Johansen | Nov. 16, 1926 |